US012694681B2

(12) United States Patent
Ganesan et al.

(10) Patent No.: US 12,694,681 B2
(45) Date of Patent: Jul. 28, 2026

(54) SYSTEMS AND METHODS FOR PERFORMING VIDEO CONFIRMATION OF SENSOR-GENERATED ALARMS

(71) Applicant: Honeywell International Inc., Charlotte, NC (US)

(72) Inventors: Balamurugan Ganesan, Bengaluru (IN); Benitta Hubert, Tamil Nadu (IN); Balaji Venkataraman, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 5 days.

(21) Appl. No.: 18/984,485

(22) Filed: Dec. 17, 2024

(65) Prior Publication Data

US 2026/0170837 A1    Jun. 18, 2026

(51) Int. Cl.
*G06V 20/52*      (2022.01)
*G06V 10/776*     (2022.01)
(Continued)

(52) U.S. Cl.
CPC ............ *G06V 20/52* (2022.01); *G06V 10/776* (2022.01); *G06V 10/7788* (2022.01); *G06V 20/41* (2022.01)

(58) Field of Classification Search
CPC .... G06V 20/52; G06V 10/7788; G06V 20/41; G06V 10/776
See application file for complete search history.

(56) References Cited

U.S. PATENT DOCUMENTS 5,216,410 A    6/1993 Pildner et al.
7,378,942 B2   5/2008 Seeley et al.
(Continued)

FOREIGN PATENT DOCUMENTS

CN    103856762 A    6/2014
CN    113935577 A    1/2022
(Continued)

OTHER PUBLICATIONS

"CCTV Design Software in use: IP Video System Design Tool," JVSG Software, 9 pages, 2019.
(Continued)

*Primary Examiner* — Omer S Khan
(74) *Attorney, Agent, or Firm* — Seager, Tufte & Wickhem, LLP

(57) ABSTRACT

Methods and systems are provided for performing video confirmation of security system alarms using automated video analytics. When a sensor generates an alarm, the system automatically identifies an associated video camera and retrieves relevant video footage corresponding to the alarm timestamp. A video analytics algorithm analyzes the footage to generate a confidence score for alarm confirmation. If the confidence score exceeds a threshold, the alarm is reported as confirmed to a central monitoring station; otherwise it is reported as unconfirmed. The system can select specific analytics algorithms based on alarm type and manage multiple associated cameras with defined priorities. The confidence scoring can consider factors like camera field of view overlap and image quality. The analytics algorithms can be trained using operator-provided ground truth data to improve accuracy.

16 Claims, 7 Drawing Sheets

(51) Int. Cl.
    *G06V 10/778*      (2022.01)
    *G06V 20/40*      (2022.01)

(56)          References Cited

U.S. PATENT DOCUMENTS

| | | | |
|---|---|---|---|
| 8,442,306 | B2 | 5/2013 | Garaas et al. |
| 8,768,307 | B1 | 7/2014 | Heins et al. |
| 8,878,846 | B1 | 11/2014 | Francis et al. |
| 9,013,505 | B1 | 4/2015 | Thornton |
| 9,679,455 | B2 | 6/2017 | Jentoft et al. |
| 9,767,663 | B2 | 9/2017 | Reske |
| 9,922,514 | B2 | 3/2018 | Gagvani et al. |
| 10,073,929 | B2 | 9/2018 | Vaynriber et al. |
| 10,261,529 | B2 | 4/2019 | Silva et al. |
| 10,338,602 | B2 | 7/2019 | Grufman et al. |
| 10,347,103 | B2 | 7/2019 | Hicks, III |
| 10,573,165 | B2 | 2/2020 | Schwarzkopf et al. |
| 10,803,720 | B2 | 10/2020 | Bucsa et al. |
| 10,832,563 | B2 | 11/2020 | Subramanian et al. |
| 10,839,608 | B2 | 11/2020 | Mittleman et al. |
| 11,036,897 | B2 | 6/2021 | Tiwari et al. |
| 11,393,317 | B2 | 7/2022 | Correnti |
| 11,941,972 | B2 | 3/2024 | Balamurugan et al. |
| 2003/0023411 | A1 | 1/2003 | Witmer et al. |
| 2005/0002662 | A1 | 1/2005 | Arpa et al. |
| 2006/0283938 | A1 | 12/2006 | Kumar et al. |
| 2008/0071559 | A1 | 3/2008 | Arrasvuori |
| 2009/0076969 | A1 | 3/2009 | Sparks |
| 2010/0134285 | A1 | 6/2010 | Holmquist |
| 2010/0161658 | A1 | 6/2010 | Hamynen et al. |
| 2010/0238286 | A1 | 9/2010 | Boghossian et al. |
| 2012/0249741 | A1 | 10/2012 | Maciocci et al. |
| 2013/0088577 | A1 | 4/2013 | Hakkarainen et al. |
| 2013/0120131 | A1* | 5/2013 | Hicks, III ............ G08B 25/007 |
| | | | 340/501 |
| 2013/0141460 | A1 | 6/2013 | Kane-Esrig et al. |
| 2013/0314542 | A1* | 11/2013 | Jackson ................... H04N 5/76 |
| | | | 348/143 |
| 2014/0039685 | A1 | 2/2014 | Blount et al. |
| 2014/0068486 | A1 | 3/2014 | Sellers et al. |
| 2014/0071164 | A1 | 3/2014 | Saklatvala et al. |
| 2014/0157206 | A1 | 6/2014 | Ovsiannikov et al. |
| 2014/0248950 | A1 | 9/2014 | Tosas Bautista |
| 2014/0266687 | A1 | 9/2014 | Britton |
| 2015/0043887 | A1 | 2/2015 | Gurudoss et al. |
| 2015/0278829 | A1 | 10/2015 | Lu et al. |
| 2016/0078698 | A1 | 3/2016 | Moses et al. |
| 2016/0078734 | A1* | 3/2016 | Jentoft ............. G08B 13/19697 |
| | | | 348/152 |
| 2016/0205355 | A1 | 7/2016 | Warzelhan et al. |
| 2016/0307374 | A1 | 10/2016 | Kurz et al. |
| 2016/0321892 | A1 | 11/2016 | Divakara et al. |
| 2017/0103644 | A1 | 4/2017 | Chauhan |
| 2017/0140620 | A1 | 5/2017 | Vanchev et al. |
| 2017/0182407 | A1 | 6/2017 | Steele et al. |
| 2017/0193395 | A1 | 7/2017 | Limonad et al. |
| 2017/0358186 | A1 | 12/2017 | Harpole |
| 2018/0067593 | A1 | 3/2018 | Tiwari et al. |
| 2018/0158265 | A1 | 6/2018 | Lyman et al. |
| 2018/0252829 | A1 | 9/2018 | Koppang et al. |
| 2019/0196424 | A1 | 6/2019 | Meganathan et al. |
| 2019/0385373 | A1 | 12/2019 | Mittleman et al. |
| 2021/0037174 | A1 | 2/2021 | Meganathan et al. |
| 2022/0108593 | A1 | 4/2022 | Jackson |
| 2023/0110861 | A1 | 4/2023 | Divakara |
| 2023/0143934 | A1* | 5/2023 | Divakara ............... H04N 7/185 |
| | | | 348/144 |
| 2023/0419801 | A1 | 12/2023 | Lindsey |
| 2024/0241903 | A1 | 7/2024 | Clark et al. |
| 2024/0256693 | A1 | 8/2024 | Wong et al. |
| 2024/0420479 | A1* | 12/2024 | Dhamija ............. G06F 16/3344 |

FOREIGN PATENT DOCUMENTS

| | | |
|---|---|---|
| CN | 114913654 A | 8/2022 |
| CN | 117275157 A | 12/2023 |
| CN | 117499597 A | 2/2024 |
| IT | 20130066 A1 | 8/2014 |
| WO | 2014/182545 A1 | 11/2014 |
| WO | 2017/148909 A1 | 9/2017 |

OTHER PUBLICATIONS

"IPVM," IPVM Camera Calculator User Manual/Guide, 45 pages, Mar. 9, 2018.
"Professional design of CCTV systems," CCTVCAD Software, 5 pages, 2004.
European Extended Search Report, Application No. 20188487.1, Nov. 25, 2020, 8 pages.
Extended European Search Report, European Patent Office, EP Application No. 22198280.4, Feb. 15, 2023 (10 pages).
Honovich, "IPVM," Google Maps Camera Calculator Released, 29 pages, Apr. 27, 2015.
Hu et al; Optimized Selection and Placement of Sensors using Building Information Models (BIM), In Proceedings of 2014 IES Annual Conference: pp. 198-202, Pittsburgh, PA, Nov. 2-4, 2014.
Motion Detector, Wikipedia, 4 p. 2021.
U.S. Appl. No. 18/808,989, filed Aug. 19, 2024, "Automated Association of Sensors and Cameras in a Security System", by Hubert et al.

* cited by examiner

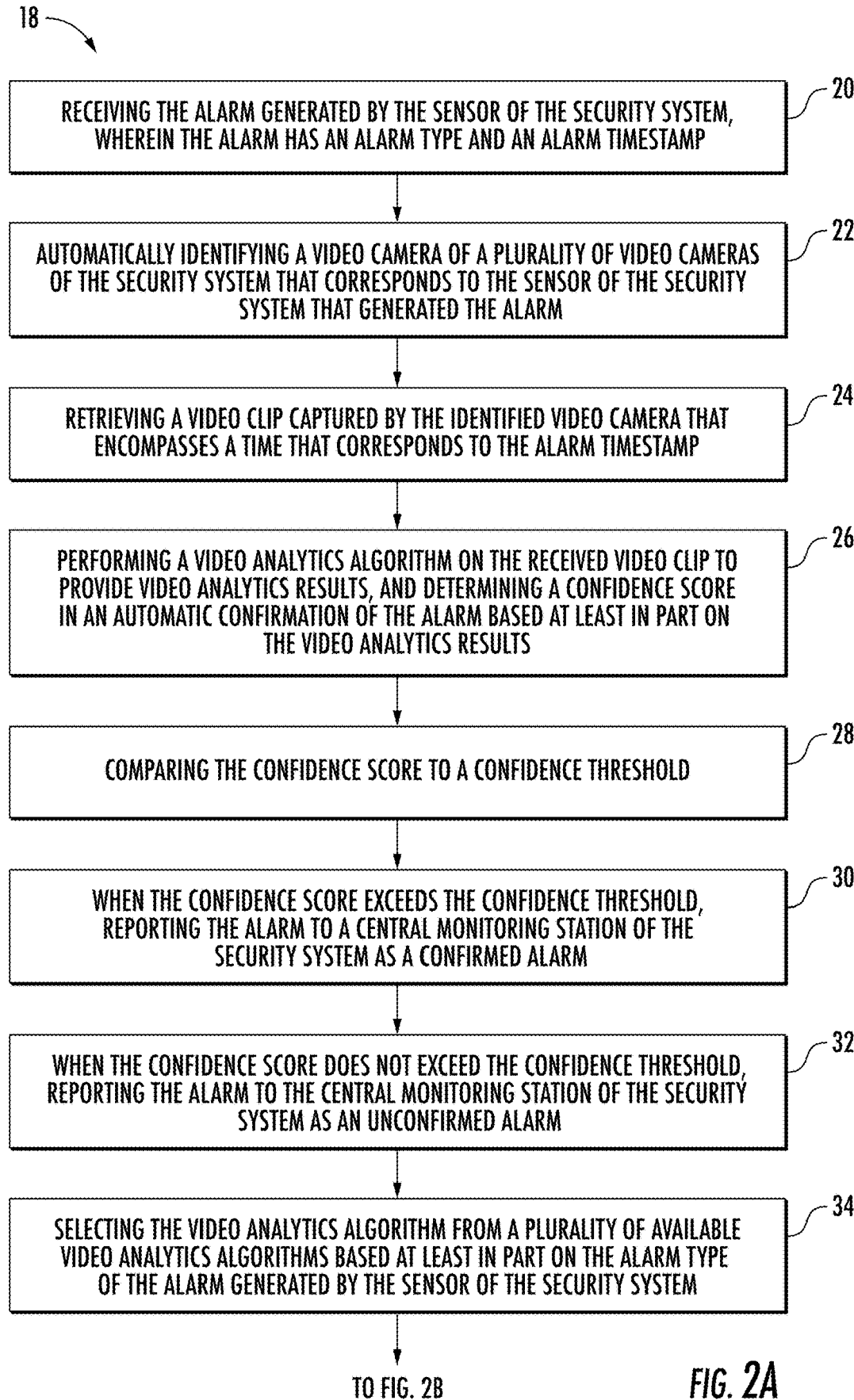

18

RECEIVING THE ALARM GENERATED BY THE SENSOR OF THE SECURITY SYSTEM, WHEREIN THE ALARM HAS AN ALARM TYPE AND AN ALARM TIMESTAMP ⟋ 20

AUTOMATICALLY IDENTIFYING A VIDEO CAMERA OF A PLURALITY OF VIDEO CAMERAS OF THE SECURITY SYSTEM THAT CORRESPONDS TO THE SENSOR OF THE SECURITY SYSTEM THAT GENERATED THE ALARM ⟋ 22

RETRIEVING A VIDEO CLIP CAPTURED BY THE IDENTIFIED VIDEO CAMERA THAT ENCOMPASSES A TIME THAT CORRESPONDS TO THE ALARM TIMESTAMP ⟋ 24

PERFORMING A VIDEO ANALYTICS ALGORITHM ON THE RECEIVED VIDEO CLIP TO PROVIDE VIDEO ANALYTICS RESULTS, AND DETERMINING A CONFIDENCE SCORE IN AN AUTOMATIC CONFIRMATION OF THE ALARM BASED AT LEAST IN PART ON THE VIDEO ANALYTICS RESULTS ⟋ 26

COMPARING THE CONFIDENCE SCORE TO A CONFIDENCE THRESHOLD ⟋ 28

WHEN THE CONFIDENCE SCORE EXCEEDS THE CONFIDENCE THRESHOLD, REPORTING THE ALARM TO A CENTRAL MONITORING STATION OF THE SECURITY SYSTEM AS A CONFIRMED ALARM ⟋ 30

WHEN THE CONFIDENCE SCORE DOES NOT EXCEED THE CONFIDENCE THRESHOLD, REPORTING THE ALARM TO THE CENTRAL MONITORING STATION OF THE SECURITY SYSTEM AS AN UNCONFIRMED ALARM ⟋ 32

SELECTING THE VIDEO ANALYTICS ALGORITHM FROM A PLURALITY OF AVAILABLE VIDEO ANALYTICS ALGORITHMS BASED AT LEAST IN PART ON THE ALARM TYPE OF THE ALARM GENERATED BY THE SENSOR OF THE SECURITY SYSTEM ⟋ 34

Figure 2B:
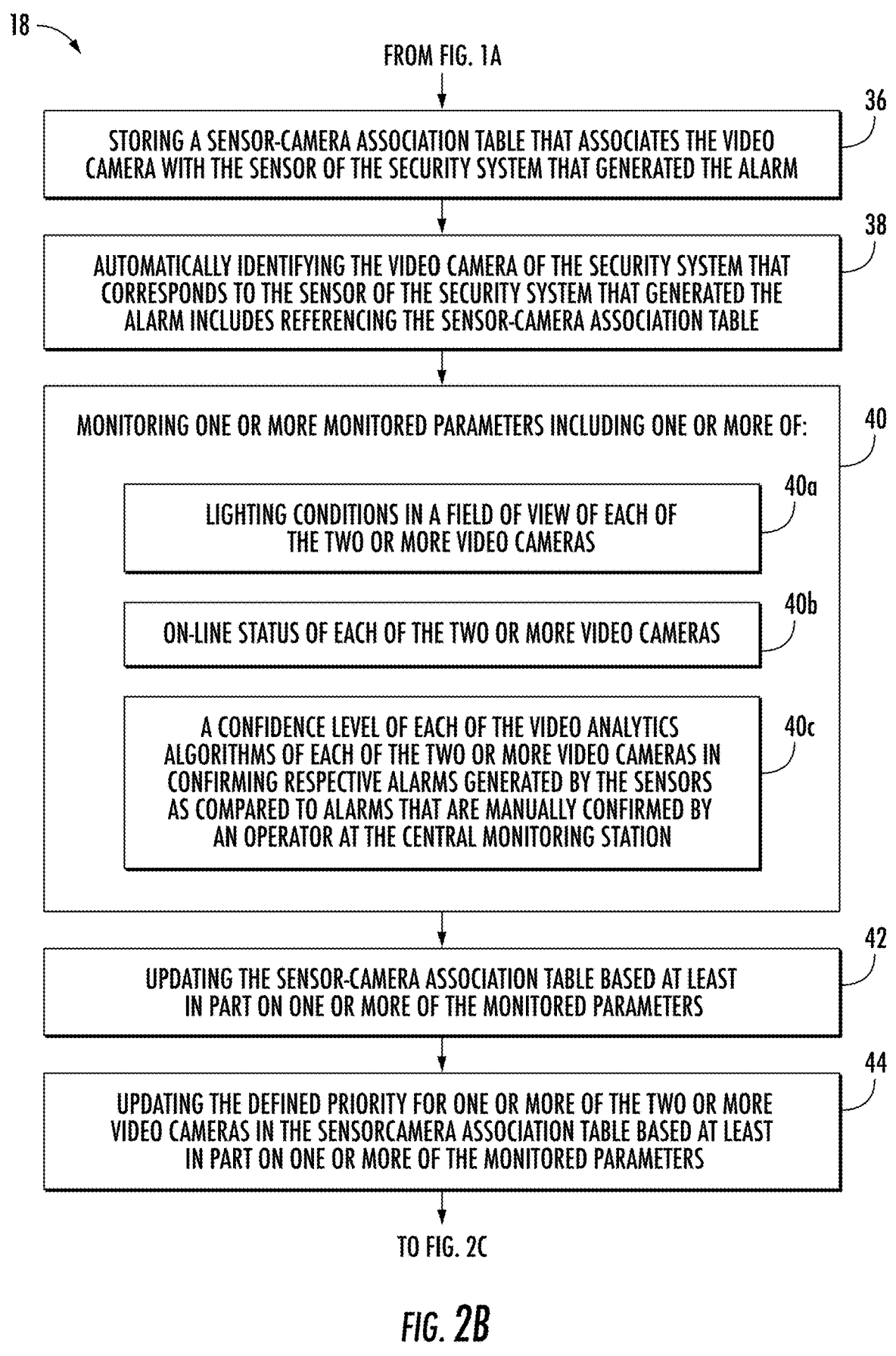

FROM FIG. 1A

STORING A SENSOR-CAMERA ASSOCIATION TABLE THAT ASSOCIATES THE VIDEO CAMERA WITH THE SENSOR OF THE SECURITY SYSTEM THAT GENERATED THE ALARM ⟍ 36

AUTOMATICALLY IDENTIFYING THE VIDEO CAMERA OF THE SECURITY SYSTEM THAT CORRESPONDS TO THE SENSOR OF THE SECURITY SYSTEM THAT GENERATED THE ALARM INCLUDES REFERENCING THE SENSOR-CAMERA ASSOCIATION TABLE ⟍ 38

MONITORING ONE OR MORE MONITORED PARAMETERS INCLUDING ONE OR MORE OF: ⟍ 40

LIGHTING CONDITIONS IN A FIELD OF VIEW OF EACH OF THE TWO OR MORE VIDEO CAMERAS ⟍ 40a

ON-LINE STATUS OF EACH OF THE TWO OR MORE VIDEO CAMERAS ⟍ 40b

A CONFIDENCE LEVEL OF EACH OF THE VIDEO ANALYTICS ALGORITHMS OF EACH OF THE TWO OR MORE VIDEO CAMERAS IN CONFIRMING RESPECTIVE ALARMS GENERATED BY THE SENSORS AS COMPARED TO ALARMS THAT ARE MANUALLY CONFIRMED BY AN OPERATOR AT THE CENTRAL MONITORING STATION ⟍ 40c

UPDATING THE SENSOR-CAMERA ASSOCIATION TABLE BASED AT LEAST IN PART ON ONE OR MORE OF THE MONITORED PARAMETERS ⟍ 42

UPDATING THE DEFINED PRIORITY FOR ONE OR MORE OF THE TWO OR MORE VIDEO CAMERAS IN THE SENSORCAMERA ASSOCIATION TABLE BASED AT LEAST IN PART ON ONE OR MORE OF THE MONITORED PARAMETERS ⟍ 44

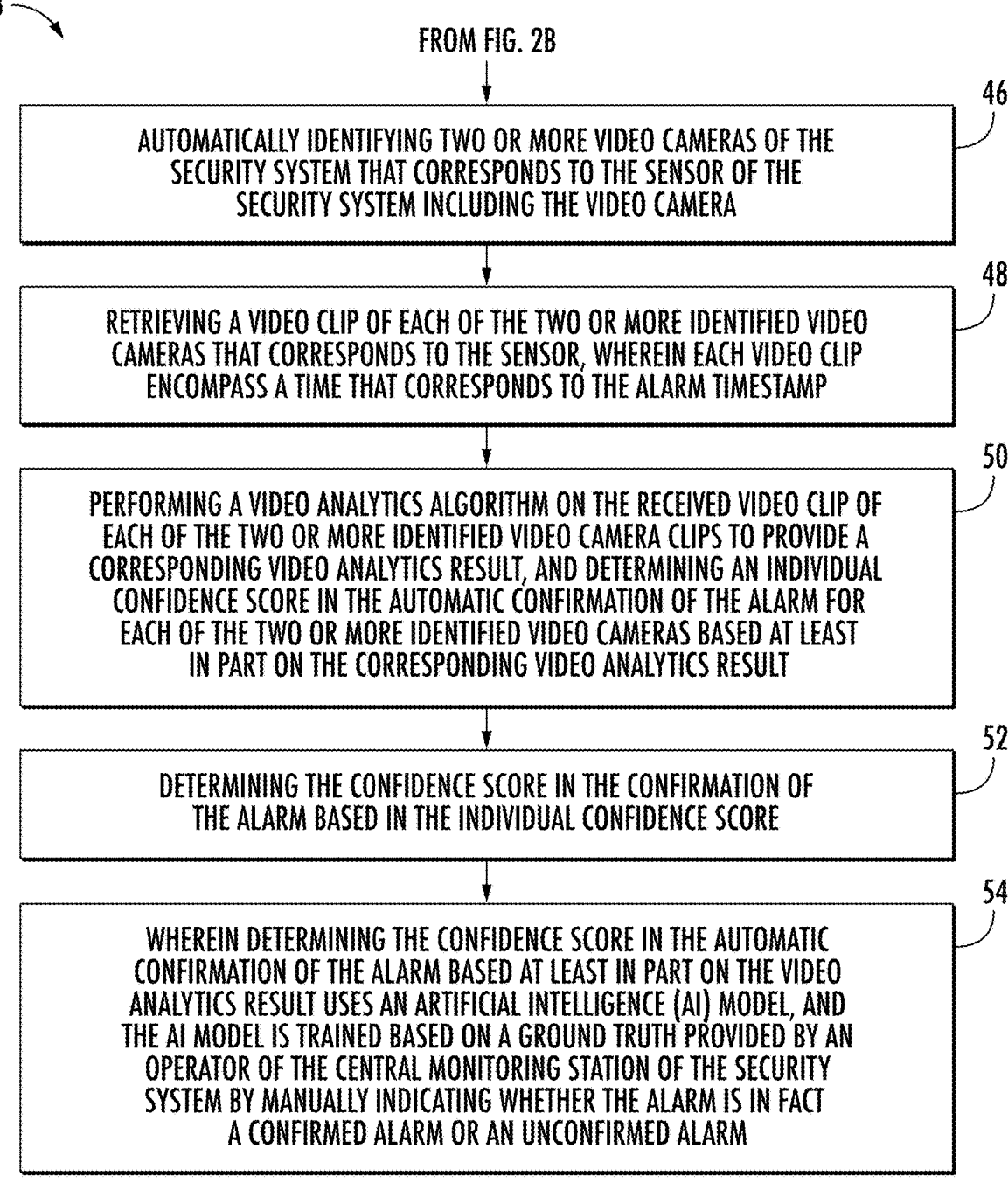

FROM FIG. 2B

AUTOMATICALLY IDENTIFYING TWO OR MORE VIDEO CAMERAS OF THE SECURITY SYSTEM THAT CORRESPONDS TO THE SENSOR OF THE SECURITY SYSTEM INCLUDING THE VIDEO CAMERA — 46

RETRIEVING A VIDEO CLIP OF EACH OF THE TWO OR MORE IDENTIFIED VIDEO CAMERAS THAT CORRESPONDS TO THE SENSOR, WHEREIN EACH VIDEO CLIP ENCOMPASS A TIME THAT CORRESPONDS TO THE ALARM TIMESTAMP — 48

PERFORMING A VIDEO ANALYTICS ALGORITHM ON THE RECEIVED VIDEO CLIP OF EACH OF THE TWO OR MORE IDENTIFIED VIDEO CAMERA CLIPS TO PROVIDE A CORRESPONDING VIDEO ANALYTICS RESULT, AND DETERMINING AN INDIVIDUAL CONFIDENCE SCORE IN THE AUTOMATIC CONFIRMATION OF THE ALARM FOR EACH OF THE TWO OR MORE IDENTIFIED VIDEO CAMERAS BASED AT LEAST IN PART ON THE CORRESPONDING VIDEO ANALYTICS RESULT — 50

DETERMINING THE CONFIDENCE SCORE IN THE CONFIRMATION OF THE ALARM BASED IN THE INDIVIDUAL CONFIDENCE SCORE — 52

WHEREIN DETERMINING THE CONFIDENCE SCORE IN THE AUTOMATIC CONFIRMATION OF THE ALARM BASED AT LEAST IN PART ON THE VIDEO ANALYTICS RESULT USES AN ARTIFICIAL INTELLIGENCE (AI) MODEL, AND THE AI MODEL IS TRAINED BASED ON A GROUND TRUTH PROVIDED BY AN OPERATOR OF THE CENTRAL MONITORING STATION OF THE SECURITY SYSTEM BY MANUALLY INDICATING WHETHER THE ALARM IS IN FACT A CONFIRMED ALARM OR AN UNCONFIRMED ALARM — 54

FIG. 2C

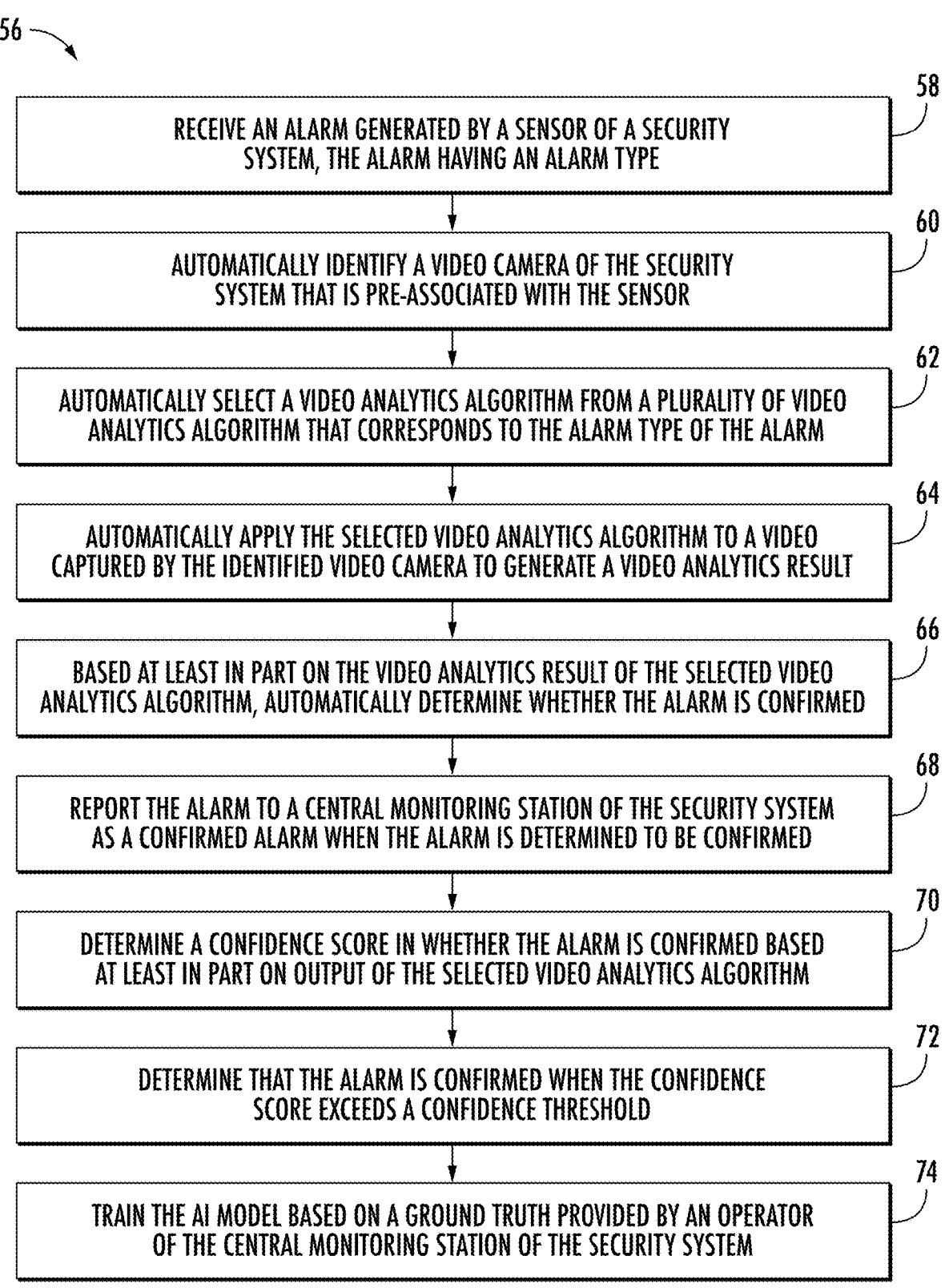

56

58
RECEIVE AN ALARM GENERATED BY A SENSOR OF A SECURITY SYSTEM, THE ALARM HAVING AN ALARM TYPE

60
AUTOMATICALLY IDENTIFY A VIDEO CAMERA OF THE SECURITY SYSTEM THAT IS PRE-ASSOCIATED WITH THE SENSOR

62
AUTOMATICALLY SELECT A VIDEO ANALYTICS ALGORITHM FROM A PLURALITY OF VIDEO ANALYTICS ALGORITHM THAT CORRESPONDS TO THE ALARM TYPE OF THE ALARM

64
AUTOMATICALLY APPLY THE SELECTED VIDEO ANALYTICS ALGORITHM TO A VIDEO CAPTURED BY THE IDENTIFIED VIDEO CAMERA TO GENERATE A VIDEO ANALYTICS RESULT

66
BASED AT LEAST IN PART ON THE VIDEO ANALYTICS RESULT OF THE SELECTED VIDEO ANALYTICS ALGORITHM, AUTOMATICALLY DETERMINE WHETHER THE ALARM IS CONFIRMED

68
REPORT THE ALARM TO A CENTRAL MONITORING STATION OF THE SECURITY SYSTEM AS A CONFIRMED ALARM WHEN THE ALARM IS DETERMINED TO BE CONFIRMED

70
DETERMINE A CONFIDENCE SCORE IN WHETHER THE ALARM IS CONFIRMED BASED AT LEAST IN PART ON OUTPUT OF THE SELECTED VIDEO ANALYTICS ALGORITHM

72
DETERMINE THAT THE ALARM IS CONFIRMED WHEN THE CONFIDENCE SCORE EXCEEDS A CONFIDENCE THRESHOLD

74
TRAIN THE AI MODEL BASED ON A GROUND TRUTH PROVIDED BY AN OPERATOR OF THE CENTRAL MONITORING STATION OF THE SECURITY SYSTEM

FIG. 3

SYSTEMS AND METHODS FOR PERFORMING VIDEO CONFIRMATION OF SENSOR-GENERATED ALARMS

TECHNICAL FIELD

The present disclosure relates generally to security systems, and more particularly to video confirmation of sensor-generated alarms within a security system.

BACKGROUND

Security systems include a variety of different sensors, including motion sensors such as PIR sensors, door contact sensors, window contact sensors, glass break detectors, fire sensors, smoke detectors, and others. When one or more of the sensors indicate a potential problem, there is a desire to confirm whether the potential problem actually exists or if can be attributed to an errant non-security related condition. Video confirmation may be used for confirmation. For example, if a video stream indicates a person climbing through an open window that has a window contact sensor indicating an alarm, the alarm can be confirmed as real. As another example, a PIR sensor may indicate motion, and a video stream may show that nobody is present at the location where motion is being detected. Accordingly, the alarm may not be confirmed and thus may be a false alarm. The motion detected by the PIR may be, for example, trees moving in the wind, snow falling, a small animal passing by, or any number of other errant non-security related conditions. Video monitoring systems may employ large numbers of video cameras, and it can be difficult to quickly ascertain which of the large number of video cameras is best positioned to confirm (or deny) a sensor-generated alarm. What would be desirable are systems and methods for automatically identifying an appropriate video camera for confirming or denying a sensor-generated alarm. What would be desirable are systems and methods that automatically identify an appropriate video clip captured by the identified video camera(s) and automatically run appropriate one or more video analytics algorithms on the video clip to automatically confirm (or deny) the sensor-generated alarm.

SUMMARY

The present disclosure relates generally to security systems, and more particularly to automatic video confirmation of sensor-generated alarms within a security system. An example may be found in a method for performing video confirmation of an alarm that is generated by a sensor of a security system. The illustrative method includes receiving the alarm generated by the sensor of the security system, wherein the alarm has an alarm type and an alarm timestamp. A video camera of a plurality of video cameras of the security system is automatically identified that corresponds to the sensor of the security system that generated the alarm. A video clip captured by the identified video camera that encompasses a time that corresponds to the alarm timestamp is retrieved. A video analytics algorithm is performed on the received video clip to provide a video analytics result. A confidence score in an automatic confirmation of the alarm is determined based at least in part on the video analytics result. The confidence score is compared to a confidence threshold. When the confidence score exceeds the confidence threshold, the alarm is reported to a central monitoring station of the security system as a confirmed alarm. When the confidence score does not exceed the confidence threshold, the alarm is reported to the central monitoring station of the security system as an unconfirmed alarm.

Another example may be found in a system. The illustrative system includes a sensor of a security system that is configured to generate an alarm, a plurality of video cameras of the security system, and a controller that is operatively coupled to the sensor and to the plurality of video cameras. The controller is configured to receive the alarm generated by the sensor, wherein the alarm has an alarm type and an alarm timestamp. The controller is configured to automatically identify a video camera of the plurality of video cameras that corresponds to the sensor that generated the alarm. The controller is configured to automatically retrieve a video clip captured by the identified video camera that encompasses a time that corresponds to the alarm timestamp. The controller is configured to automatically perform a video analytics algorithm on the received video clip to provide a video analytics result. The controller is configured to automatically determine a confidence score in an automatic confirmation of the alarm based at least in part on the video analytics result. The controller is configured to automatically compare the confidence score to a confidence threshold. When the confidence score exceeds the confidence threshold, the controller is configured to report the alarm as a confirmed alarm. When the confidence score does not exceed the confidence threshold, the controller is configured to report the alarm as an unconfirmed alarm.

Another example may be found in a non-transitory computer readable medium storing instructions. When the instructions are executed by one or more processors, the one or more processors are caused to receive an alarm generated by a sensor of a security system, the alarm having an alarm type. The one or more processors are caused to automatically identify a video camera of the security system that is pre-associated with the sensor. The one or more processors are caused to automatically selecting a video analytics algorithm from a plurality of video analytics algorithm that corresponds to the alarm type of the alarm. The one or more processors are caused to automatically applying the selected video analytics algorithm to a video captured by the identified video camera to generate a video analytics result. Based at least in part on the video analytics result of the selected video analytics algorithm, the one or more processors are caused to automatically determine whether the alarm is confirmed. The one or more processors are caused to report the alarm to a central monitoring station of the security system as a confirmed alarm when the alarm is determined to be confirmed.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIGS. 2A, 2B and 2C are flow diagrams that together show an illustrative method for performing video confirmation of a sensor-generated alarm;

FIG. 3 is a flow diagram showing an illustrative series of steps that may be carried out by one or more processors when the one or more processors carry out instructions stored on a non-transient computer readable medium;

Figure 1:
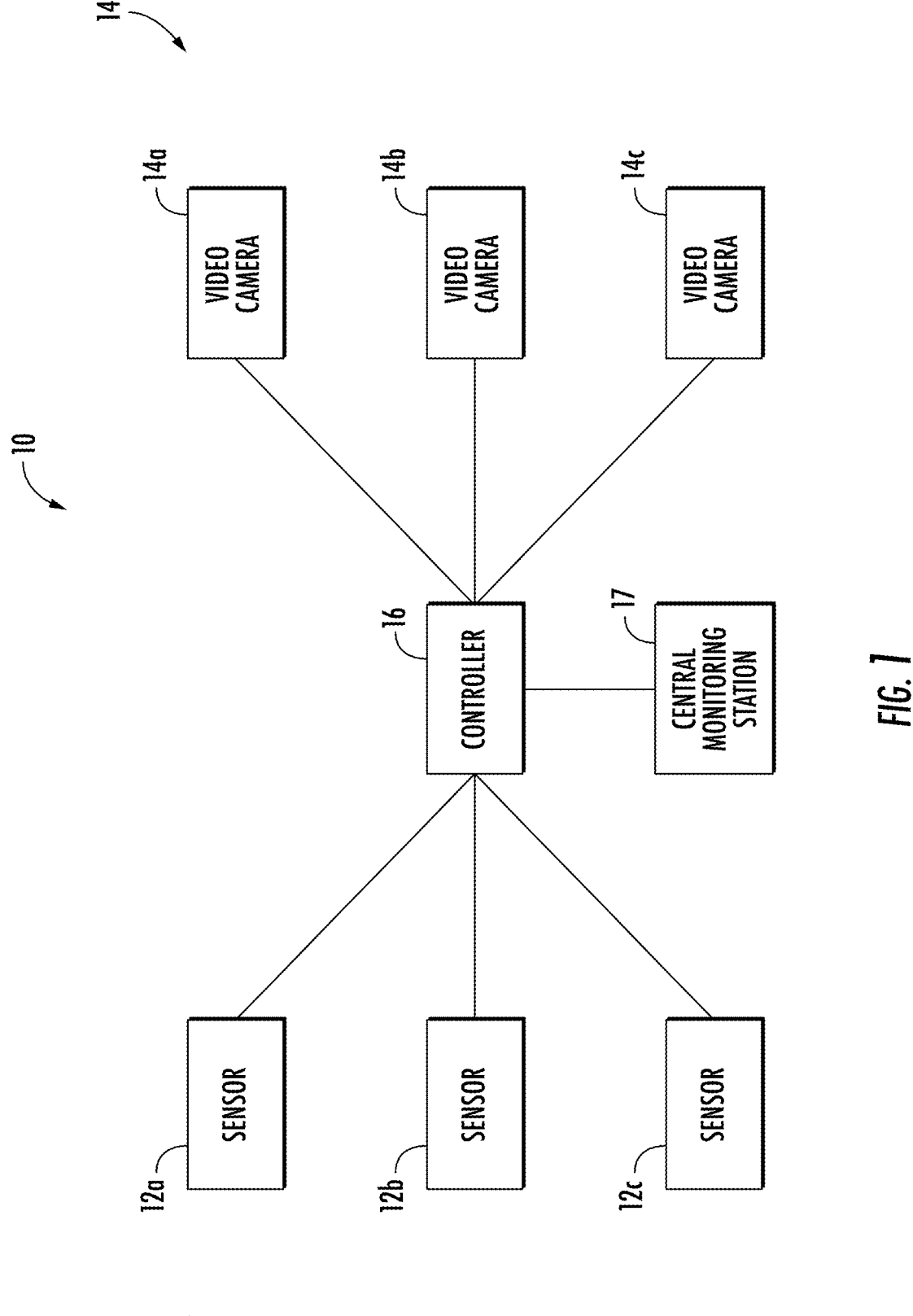
FIG. 1 is a schematic block diagram showing an illustrative system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/of" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative system 10. The illustrative system 10 may include, or communicate with, components of a security system. A security system may include a number of sensors 12, individually labeled as 12*a*, 12*b* and 12*c*. While a total of three sensors 12 are shown, a security system may include, and the system 10 may include, or communicate with, any number of sensors 12. Each of the sensors 12 may be configured to generate an alarm. In some cases, each of the sensors 12 may independently be a door contact sensor, a window contact sensor, a motion sensor such as a PIR (passive infrared) sensor, a glass break detector, a fire sensor, a smoke sensor and/or others. In some cases, some of the sensors 12 may be magnetic contact sensors. A security system may include a number of video cameras 14, individually labeled as 14*a*, 14*b* and 14*c*. While a total of three video cameras 14 are shown, a security system may include, and the system 10 may include, or communicate with, any number of video cameras 14. The system 10 may include a controller 16 that is operatively coupled to the sensors 12 and to the video cameras 14.

The controller 16 is configured to receive an alarm having an alarm type and an alarm timestamp from one or more of the sensors 12, and to automatically identify one or more of the video cameras 14 that correspond to the sensor 12 that generated the alarm. The controller 16 is configured to automatically retrieve a video clip captured by the identified video camera 14 that encompasses a time that corresponds to the alarm timestamp and to automatically perform a video analytics algorithm on the received video clip to provide a video analytics result. In some cases, the controller 16 may be configured to select the video analytics algorithm from a plurality of available video analytics algorithms based at least in part on the alarm type of the alarm generated by the sensor 12. In some cases, the controller 16 may be configured to train the video analytics algorithm over time based on a ground truth provided by an operator of the security system by manually indicating whether the alarm is in fact a confirmed alarm or an unconfirmed alarm.

The controller 16 is configured to determine a confidence score in an automatic confirmation of the alarm based at least in part on the video analytics result. In some cases, the confidence score in the automatic confirmation of the alarm may be dependent on an overlap of a field of view of the identified video camera 14 with an alarm condition that corresponds to the alarm. In some cases, the confidence score in the automatic confirmation of the alarm may be dependent on an image quality of the video clip captured by the identified video camera 14 that encompasses the alarm timestamp. These are just examples. The controller 16 is configured to automatically compare the confidence score to a confidence threshold. When the confidence score exceeds the confidence threshold, the controller 16 is configured to report the alarm to the central monitoring station 17 as a confirmed alarm. When the confidence score determined by the video analytics algorithm does not exceed the confidence threshold, the controller 16 is configured to report the alarm to the central monitoring station 17 as an unconfirmed alarm. In some cases, the central monitoring station 17 may also be operatively coupled with the controller 16, the sensors 12 and/or the video cameras 14. In some cases, this may significantly reduce the need for manual intervention to analyze video streams for alarm confirmation. This may dramatically improve operator productivity and significantly reduce the response time for handling alarms in a security system.

FIGS. 2A, 2B and 2C are flow diagrams that together show an illustrative method 18 for performing video confirmation of an alarm that is generated by a sensor of a security system. The illustrative method 18 includes receiving the alarm generated by the sensor of the security system, wherein the alarm has an alarm type and an alarm timestamp, as indicated at block 20. A video camera of a plurality of video cameras of the security system is automatically identified that corresponds to the sensor of the security system that generated the alarm, as indicated at block 22. A video clip captured by the identified video camera that encompasses a time that corresponds to the alarm timestamp is retrieved, as indicated at block 24. A video analytics algorithm is performed on the received video clip. A confidence score in an automatic confirmation of the alarm is determined based at least in part on the video analytics result, as indicated at block 26. The confidence score is compared to a confidence threshold, as indicated at block 28. When the confidence score exceeds the confidence threshold, the alarm is reported to a central monitoring station of the security system as a confirmed alarm, as indicated at block 30. When the confidence score does not exceed the confidence threshold, the alarm is reported to the central monitoring station of the security system as an unconfirmed alarm, as indicated at block 32. In some cases, the method 18 may further include selecting the video analytics algorithm from a plurality of available video analytics algorithms based at least in part on the alarm type of the alarm generated by the sensor of the security system, as indicated at block 34.

Continuing on FIG. 2B, the method 18 may include storing a sensor-camera association table that associates the video camera(s) with the sensor(s) of the security system that generate the alarms, as indicated at block 36. In some cases, the method 18 may include automatically identifying the video camera of the security system that corresponds to the sensor of the security system that generated the alarm by referencing the sensor-camera association table. In some cases, the sensor-camera association table may also identify the video analytics algorithm from a plurality of video analytics algorithm based at least in part on the alarm type of the alarm generated by the sensor of the security system. In some cases, the sensor-camera association table may associate two or more video cameras of the security system with the sensor, and a defined priority for each of the two or more video cameras.

In some cases, the method 18 may include monitoring one or more monitored parameters, as indicated at block 40. The one or more monitored parameters may include lighting conditions in a field of view of each of the two or more video cameras, as indicated at block 40a. The one or more monitored parameters may include an on-line status of each of the two or more video cameras, as indicated at block 40b. The one or more monitored parameters may include a confidence level of each of the video analytics algorithms of each of the two or more video cameras in confirming respective alarms generated by the sensor(s) as compared to alarms that are manually confirmed by an operator at the central monitoring station, as indicated at block 40c. The method 18 may include updating the sensor-camera association table over time based at least in part on one or more of the monitored parameters, as indicated at block 42. In some cases, the defined priority for one or more of the two or more video cameras may be updated in the sensor-camera association table based at least in part on one or more of the monitored parameters, as indicated at block 44.

Continuing on FIG. 2C, the method 18 may include automatically identifying two or more video cameras of the security system that corresponds to the sensor of the security system including the video camera, as indicated at block 46. In some cases, a video clip of each of the two or more identified video cameras that corresponds to the sensor may be retrieved, wherein each video clip encompasses a time that corresponds to the alarm timestamp, as indicated at block 48. A video analytics algorithm may be performed on the received video clip each of the two or more identified video cameras clip to provide a corresponding video analytics result. An individual confidence score in the automatic confirmation of the alarm for each of the two or more identified video cameras is determined based at least in part on the corresponding video analytics result, as indicated at block 50. In some cases, the method 18 may include determining the confidence score in the confirmation of the alarm based in the individual confidence score, as indicated at block 52.

The confidence score in the automatic confirmation of the alarm may be dependent on an overlap of a field of view of the identified video camera with an alarm condition that corresponds to the alarm. The confidence score in the automatic confirmation of the alarm may be dependent on an image quality of the video clip captured by the identified video camera that encompasses the alarm timestamp. These are just examples. In some cases, the sensor may be one of a motion sensor, a glass break sensor and a magnetic contact sensor. In some cases, determining the confidence score in the automatic confirmation of the alarm based at least in part on the video analytics result uses an Artificial Intelligence (AI) model, and the AI model is trained over time based on a ground truth provided by an operator of the central monitoring station of the security system by manually indicating whether the alarm is in fact a confirmed alarm or an unconfirmed alarm, as indicated at block 54.

FIG. 3 is a flow diagram showing an illustrative series of steps 56 that may be carried out by one or more processors when the one or more processors carry out instructions stored on a non-transient computer readable medium. The one or more processors may be part of the controller 16, for example. The one or more processors are caused to receive an alarm generated by a sensor of a security system, the alarm having an alarm type, as indicated at block 58. The one or more processors are caused to automatically identify a video camera of the security system that is pre-associated with the sensor, as indicated at block 60. The one or more processors are caused to automatically select a video analytics algorithm from a plurality of video analytics algorithm that corresponds to the alarm type of the alarm, as indicated at block 62. The one or more processors are caused to automatically apply the selected video analytics algorithm to a video captured by the identified video camera to generate a video analytics result, as indicated at block 64. Based at least in part on the video analytics result of the selected video analytics algorithm, the one or more processors are caused to automatically determine whether the alarm is confirmed, as indicated at block 66. The one or more processors are caused to report the alarm to a central monitoring station of the security system as a confirmed alarm when the alarm is determined to be confirmed, as indicated at block 68.

In some cases, the one or more processors may be caused to determine a confidence score in whether the alarm is confirmed based at least in part on output of the selected video analytics algorithm, as indicated at block 70. A determination may be made that the alarm is confirmed when the confidence score exceeds a confidence threshold, as indicated at block 72. In some cases, automatically determining whether the alarm is confirmed may be based at least in part on an Artificial Intelligence (AI) Model. The instructions may cause the one or more processors to train the AI model over time based on a ground truth provided by an operator of the central monitoring station of the security system, as indicated at block 74.

Figure 4:
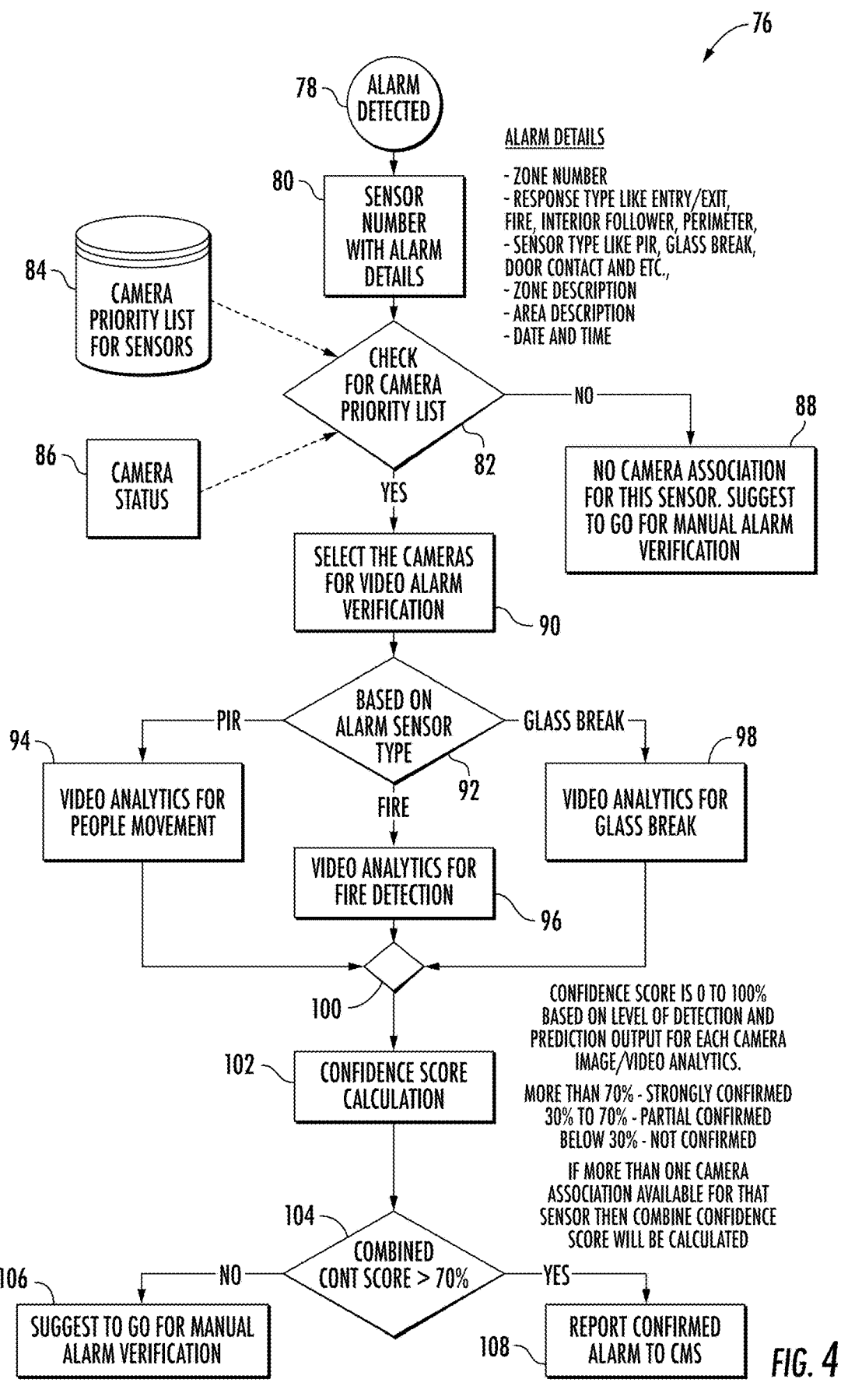
FIG. 4 is a flow diagram showing an illustrative method.

FIG. 4 is a flow diagram that shows an illustrative method 76. The method 76 begins with an alarm being detected by a sensor, as indicated at block 78. A sensor number and alarm details are obtained, as indicated at block 80. The alarm details may include one or more of alarm type, zone location, sensor type, zone description, area description, date/time and/or any other suitable alarm details. A determination is made as to whether a camera priority list exists, as indicated at decision block 82. This may include getting camera priority information from a database 84 as well as camera status (on-line, off-line), as indicated at block 86. If no camera priority list exists, control passes to block 88, where manual alarm verification may be suggested. If there is a camera priority list, control passes to block 90, where the camera or cameras for alarm verification are automatically selected from the camera priority list.

A determination is made at decision block 92 as to the sensor type of the sensor that triggered the alarm. In this example, the options are PIR sensor, fire sensor and glass break detector. If a PIR sensor triggered the alarm, control passes to block 94, and video analytics for people movement are executed on a video clip that includes the alarm event. If a fire sensor triggered the alarm, control passes to block 96 and video analytics for detecting fire are executed on a video clip that includes the alarm event. If a glass break detector triggered the alarm, control passes to block 98 and video analytics for detecting glass breakage are executed on a video clip/audio clip that includes the alarm event. Control then passes to summation block 100, and then to block 102 where a confidence score in a confirmation of the alarm is calculated. In some cases, the confidence score ranges from 0 to 100 percent based on the level of detection and prediction output for each camera/video analytics. A confidence score that is greater than 70 percent correlates to strongly confirmed, a confidence score of 30 to 70 percent correlates to partially confirmed, and a confidence score of less than 30 percent means not confirmed. These are just examples. If multiple cameras are involved, then a combined confidence score may be calculated and used. A determination is made at decision block 104 as to whether the confidence score (or combined confidence score) is greater than 70 percent (predetermined confidence score threshold). If not, control passes to block 106, and manual verification is suggested. If so, control passes to block 108, and the confirmed alarm is reported as a confirmed alarm.

Figure 5:
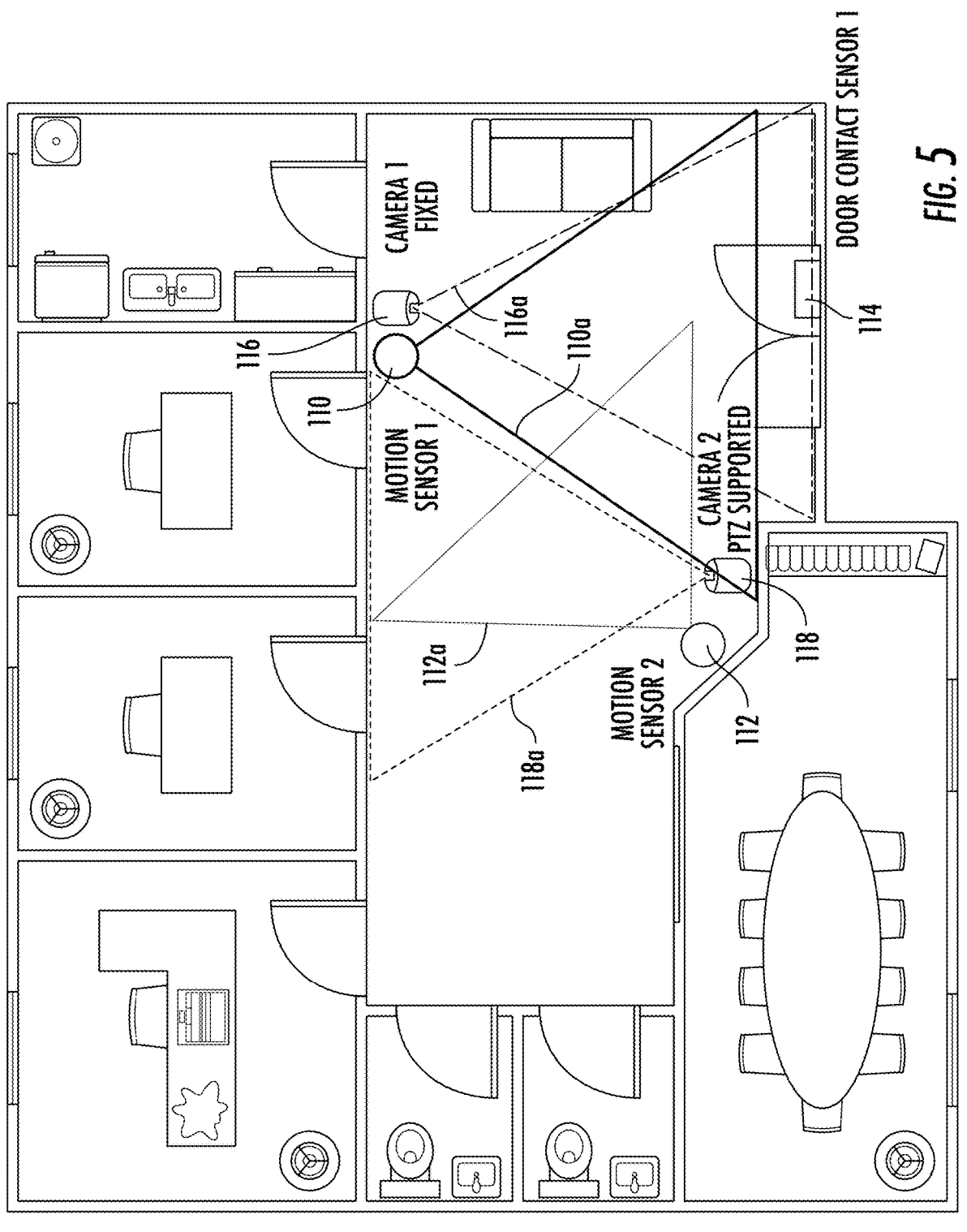
FIG. 5 is a schematic example of a floor plan.

FIG. 5 is a schematic floor plan showing several sensors, including a first motion sensor 110 having a field of view (FOV) 110*a*, a second motion sensor 112 having a FOV 112*a*, and a door contact sensor 114. A first camera 116 has a fixed FOV 116*a* and a second camera 118 has an adjustable FOV 118*a*. In some cases, the second camera 118 has a Pan-Tilt-Zoon (PTZ) capability. Based on the floor map, sensor and camera capabilities, and mounting location, the following camera priority list for each camera is initially prepared. The camera priority list may subsequently be dynamically adjusted based on confirmation capabilities, confidence scores, configuration changes and current status of each of the plurality of video cameras.

| Sensor | Camera's priority | Initial Priority based on | Dynamic priority update |
|---|---|---|---|
| PIR 1 (Motion Sensor 1) | Camera 1 | FOV highly overlaps Frame rate higher People recognition analytics High Resolution No PTZ support | During disarm period, the confirmation capability of camera for every movement detected by PIR. During disarm period, |
| | Camera 2 | FOV partially overlaps Frame rate is medium No Analytics High resolution PTZ support | Confidence score of the camera for every movement detection by PIR. |
| PIR 2 (Motion Sensor 2) | Camera 2 | FOV highly overlaps Frame rate is medium No Analytics High resolution PTZ support | Camera or sensor configuration changes. Camera or sensor status changes. |
| | Camera 1 | FOV partially overlaps Frame rate higher | |

-continued

| Sensor | Camera's priority | Initial Priority based on | Dynamic priority update |
|---|---|---|---|
| | | People recognition analytics High Resolution No PTZ support | |

The following table provides the types of sensors and the corresponding video analytics algorithms that can be used for better confirmation of alarms. This can lead to improved alarm detection in a shorter time, and with fewer false alarms.

| Sensors | Video Analytics | Description |
|---|---|---|
| PIR | Video motion detection (VMD) | Person entering to a defined detection zone. Person leaving the defined detection zone. |
| | Tripwire | Undesired movement in restricted areas by defining the zone |
| Seismic | Weapon detection | Generally, the bank safes and ATMs are attacked by weapons. The weapon detection algorithm can detect the weapons from the images and confirm the alarm. |
| | Loitering/ Behavioral detection | Looking for suspicious behavior of people moving around in the defined detection zone. |
| Fire | VIFD (Video Image Flame detection) | Flame monitor designed for flame size & intensity monitoring. It helps to detect and track flames. |
| | VISD (Video Image Smoke detection) | Smoke monitor designed for identify the presence of smoke in the image captured. |
| Glass Break | Glass break analysis | Detects scratches, digs, cracks, chips, pinholes, etc. on the glass. |
| Entry/Exit Door contact | Video motion detection (VMD) | Person entering to a defined detection zone. Person leaving the defined detection zone. |
| All Sensors (Tamper alarm) | Image segmentation | Selects sensor segments in an image is identified and it focus only that zone for tamper detection. It detects when there is sensor cover removal, sensor ripped off, spray painted, masked by covering. |

A confidence score may be calculated in the range of 0 to 100% based on level of detection, video analytics results and number of cameras confirming the alarm. In some cases, a formula may be used to determine the confidence score. The level of detection may be based at least in part on, for example, image quality, Field of View (FOV) covering the alarm event, scene lighting, camera specifications (night vision, PTZ), etc. The formula may include weights associated with each of a number of parameters. In the examples below, 30/20 are the weights, the parameters like level of detection/prediction or object detection are all Boolean values (1 or 0) based on threshold-based analysis results. This 30/20 are example weights with the available parameters with the site-specific configuration. These weights and parameters may be updated for the other sites based on, for example, the particular site configuration, site sensors, site video cameras and site camera mapping to each sensor. These are just examples.

For motion detection/entry-exit door detection events,

Confidence score=(30*(Video analytics Level of detection and prediction)+30*(Object detected as human movement in VA)+20*(More than one camera confirmed the alarm)+20*(Image Quality/View and Lighting))

For fire detection events,

Confidence score=(30*(Video analytics Level of detection and prediction)+30*(Smoke/Flame detection in VA)+20*(More than one camera confirmed the alarm)+20*(Image Quality/View and Lighting))

For seismic detection events,

Confidence score=(30*(Video analytics Level of detection and prediction)+30*(Weapon and/or Human loitering detected in VA)+20*(More than one camera confirmed the alarm)+20*(Image Quality/View and Lighting))

For glass break detection events,

Confidence score=(30*(Video analytics Level of detection and prediction)+30*(Detects scratches, digs, cracks on the glass in VA)+20*(More than one camera confirmed the alarm)+20*(Image Quality/View and Lighting))

For Tamper detection events,

Confidence score=(30*(Video analytics Level of detection and prediction)+30*(detects cover/ sensor rip off, masked in VA)+20*(More than one camera confirmed the alarm)+20*(Image Quality/View and Lighting))

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for performing video confirmation of an alarm that is generated by a sensor of a security system, the method comprising:

storing a sensor-camera association table that associates the video camera with the sensor of the security system that generated the alarm;

receiving the alarm generated by the sensor of the security system, wherein the alarm has an alarm type and an alarm timestamp;

automatically identifying a video camera of a plurality of video cameras of the security system that corresponds to the sensor of the security system that generated the alarm by referencing the sensor-camera association table;

retrieving a video clip captured by the identified video camera that encompasses a time that corresponds to the alarm timestamp;

selecting a video analytics algorithm from a plurality of available video analytics algorithms based at least in part on the alarm type of the alarm generated by the sensor of the security system, wherein the sensor-camera association table identifies the video analytics algorithm from the plurality of video analytics algorithms based at least in part on the alarm type of the alarm generated by the sensor of the security system;

performing the video analytics algorithm on the received video clip to provide a video analytics result;

determining a confidence score in an automatic confirmation of the alarm based at least in part on the video analytics result;

comparing the confidence score to a confidence threshold;

when the confidence score exceeds the confidence threshold, reporting the alarm to a central monitoring station of the security system as a confirmed alarm; and when the confidence score does not exceed the confidence threshold, reporting the alarm to the central monitoring station of the security system as an unconfirmed alarm.

2. The method of claim 1, wherein the sensor-camera association table associates two or more video cameras of the security system with the sensor, and a defined priority for each of the two or more video cameras.

3. The method of claim 2, comprising:

monitoring one or more monitored parameters including one or more of:

lighting conditions in a field of view of each of the two or more video cameras;

on-line status of each of the two or more video cameras;

a confidence level of each of the video analytics algorithms of each of the two or more video cameras in confirming respective alarms generated by the sensor as compared to alarms that are manually confirmed by an operator at the central monitoring station; and updating the sensor-camera association table based at least in part on one or more of the monitored parameters.

4. The method of claim 3, comprising:

updating the defined priority for one or more of the two or more video cameras in the sensor-camera association table based at least in part on one or more of the monitored parameters.

5. The method of claim 2, wherein:

automatically identifying two or more video cameras of the security system that corresponds to the sensor of the security system including the video camera;

retrieving a video clip of each of the two or more identified video cameras that corresponds to the sensor, wherein each video clip encompasses a time that corresponds to the alarm timestamp;

performing a video analytics algorithm on the received video clip of each of the two or more identified video cameras clip to provide a corresponding video analytics result; and determining an individual confidence score in the automatic confirmation of the alarm for each of the two or more identified video cameras based at least in part on the corresponding video analytics result.

6. The method of claim 5, comprising determining the confidence score in the confirmation of the alarm based on the individual confidence score.

7. The method of claim 1, wherein the confidence score in the automatic confirmation of the alarm is dependent on one or more of:

an overlap of a field of view of the identified video camera with an alarm condition that corresponds to the alarm; and an image quality of the video clip captured by the identified video camera that encompasses the alarm timestamp.

8. The method of claim 1, wherein the sensor is one of a motion sensor, a glass break sensor and a magnetic contact sensor.

9. The method of claim 1, wherein determining the confidence score in the automatic confirmation of the alarm based at least in part on the video analytics result uses an Artificial Intelligence (AI) model, the method comprising:

training the AI model based on a ground truth provided by an operator of the central monitoring station of the security system by manually indicating whether the alarm is in fact a confirmed alarm or an unconfirmed alarm.

10. A system comprising:

a sensor of a security system that is configured to generate an alarm;

a plurality of video cameras of the security system;

a controller operatively coupled to the sensor and the plurality of video cameras, the controller is configured to:

store a sensor-camera association table that associates the video camera with the sensor of the security system that qenerated the alarm;

receive the alarm generated by the sensor, wherein the alarm has an alarm type and an alarm timestamp;

automatically identify a video camera of the plurality of video cameras that corresponds to the sensor that generated the alarm by referencing the sensor-camera association table;

automatically retrieve a video clip captured by the identified video camera that encompasses a time that corresponds to the alarm timestamp;

automatically select a video analytics algorithm from a plurality of available video analytics algorithms based at least in part on the alarm type of the alarm generated by the sensor of the security system, wherein the sensor-camera association table identifies the video analytics algorithm from a plurality of video analytics algorithms based at least in part on the alarm type of the alarm qenerated by the sensor of the security system;

automatically perform the video analytics algorithm on the received video clip to provide a video analytics result;

automatically determine a confidence score in an automatic confirmation of the alarm based at least in part on the video analytics result;

automatically compare the confidence score to a confidence threshold;

when the confidence score exceeds the confidence threshold, report the alarm as a confirmed alarm; and when the confidence score does not exceed the confidence threshold, report the alarm as an unconfirmed alarm.

11. The system of claim 10, wherein the confidence score in the automatic confirmation of the alarm is dependent on one or more of:

an overlap of a field of view of the identified video camera with an alarm condition that corresponds to the alarm; and an image quality of the video clip captured by the identified video camera that encompasses the alarm timestamp.

12. The system of claim 10, wherein the sensor is one of a motion sensor, a glass break sensor and a magnetic contact sensor.

13. The system of claim 10, wherein the controller is configured to train the video analytics algorithm based on a ground truth provided by an operator of the security system by manually indicating whether the alarm is in fact a confirmed alarm or an unconfirmed alarm.

14. A non-transitory computer readable medium storing instructions that when executed by one or more processors cause the one or more processors to:

store a sensor-camera association table that associates the video camera with the sensor of the security system that qenerated the alarm;

receive an alarm generated by a sensor of a security system, the alarm having an alarm type;

automatically identify a video camera of the security system that is pre-associated with the sensor by referencing the sensor-camera association table;

automatically select a video analytics algorithm from a plurality of video analytics algorithm that corresponds to the alarm type of the alarm, wherein the sensor-camera association table identifies the video analytics algorithm from a plurality of video analytics algorithms based at least in part on the alarm type of the alarm qenerated by the sensor of the security system;

automatically apply the selected video analytics algorithm to a video captured by the identified video camera to generate a video analytics result;

based at least in part on the video analytics result of the selected video analytics algorithm, automatically determine whether the alarm is confirmed or not; and report the alarm to a central monitoring station of the security system as a confirmed alarm when the alarm is determined to be confirmed.

15. The non-transitory computer readable medium of claim 14, wherein the instructions cause the one or more processors to:

determine a confidence score in whether the alarm is confirmed based at least in part on the video analytics result of the selected video analytics algorithm; and determine that the alarm is confirmed when the confidence score exceeds a confidence threshold.

16. The non-transitory computer readable medium of claim 14, wherein automatically determining whether the alarm is confirmed is based at least in part on an Artificial Intelligence (AI) Model, and where the instructions cause the one or more processors to:

train the AI model based on a ground truth provided by an operator of the central monitoring station of the security system.

\*   \*   \*   \*   \*